(12) United States Patent
Schröder et al.

(10) Patent No.: US 11,497,105 B2
(45) Date of Patent: *Nov. 8, 2022

(54) METHOD FOR SETTING UP AND OPERATING A NETWORK OF LUMINAIRES

(71) Applicant: SCHREDER, Brussels (BE)

(72) Inventors: Helmut Schröder, Wiesbaden (DE); Daniel Brand, Cologne (DE); Didier Wellens, Kraainem (BE)

(73) Assignee: Schreder, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,680

(22) Filed: Oct. 12, 2020

(65) Prior Publication Data

US 2021/0045222 A1    Feb. 11, 2021

Related U.S. Application Data

(63) Continuation of application No. 16/275,454, filed on Feb. 14, 2019, now Pat. No. 10,806,012, which is a
(Continued)

(30) Foreign Application Priority Data

Nov. 10, 2014  (EP) .................................. 14192579

(51) Int. Cl.
*H05B 47/19*  (2020.01)
*H04W 40/24*  (2009.01)
(Continued)

(52) U.S. Cl.
CPC .............. *H05B 47/19* (2020.01); *H04L 67/12* (2013.01); *H04W 40/246* (2013.01); *H04W 84/18* (2013.01)

(58) Field of Classification Search
CPC ........ H05B 47/10; H05B 47/18; H05B 47/19; H05B 47/155; H05B 45/10; H05B 45/14;
(Continued)

(56) References Cited

U.S. PATENT DOCUMENTS 9,832,833 B1 * 11/2017 Pipe-Mazo .......... H05B 47/115
9,930,166 B2    3/2018 Garcia Morchon
(Continued)

FOREIGN PATENT DOCUMENTS

EP          2262350 A1    12/2010
JP       2002163002 A      6/2002
(Continued)

OTHER PUBLICATIONS http://www.cimconautomation.com/power/street_light_cm.htm (2009) XP055204539.
(Continued)

*Primary Examiner* — Abdullah A Riyami
*Assistant Examiner* — Syed M Kaiser
(74) *Attorney, Agent, or Firm* — Browdy and Neimark, P.L.L.C.

(57) ABSTRACT

Described herein is method for setting up a network of luminaires and their subsequent operation. A plurality of luminaires are located on a street (24, 29), and each luminaire comprises a control module (23, 28). The method for setting up the network comprises, for each control module, scanning the environment and providing environmental information to a central server, which, allocates the control modules and their associated luminaires into groups (A, B). A group controller (23', 28', 31, 32) is allocated for each group which has long-distance communication with the server and short-distance communication with control modules within its group. Each group controller and control modules within the group form a network which can operate
(Continued)

autonomously or under the control of the server. Some of the control modules may include sensors (S1, S2) which provide signals indicative of changes in the environment allowing the network to adapt its operation in accordance with those changes.

21 Claims, 7 Drawing Sheets

Related U.S. Application Data continuation of application No. 15/525,265, filed as application No. PCT/EP2015/076144 on Nov. 10, 2015, now Pat. No. 10,212,789.

(51) Int. Cl.
*H04W 84/18* (2009.01)
*H04L 67/12* (2022.01)

(58) Field of Classification Search
CPC ..... H04L 12/46; H04L 12/413; H04L 12/423; H04L 12/425
See application file for complete search history.

(56) References Cited

U.S. PATENT DOCUMENTS

| | | | |
|---|---|---|---|
| 10,314,146 B1* | 6/2019 | Wilburn | H05B 47/19 |
| 2012/0143383 A1 | 6/2012 | Cooperrider et al. | |
| 2012/0147604 A1* | 6/2012 | Farmer | F21V 23/0435 |
| | | | 362/249.03 |
| 2012/0286770 A1 | 11/2012 | Schroder et al. | |
| 2013/0044488 A1 | 2/2013 | Hreish | |
| 2013/0057158 A1* | 3/2013 | Josefowicz | H05B 47/22 |
| | | | 315/152 |
| 2013/0297212 A1* | 11/2013 | Ramer | H05B 47/175 |
| | | | 702/1 |
| 2014/0035482 A1* | 2/2014 | Rains, Jr. | H04L 12/2816 |
| | | | 315/294 |
| 2014/0197745 A1* | 7/2014 | Agrawal | H05B 47/22 |
| | | | 315/151 |
| 2014/0252961 A1* | 9/2014 | Ramer | H05B 47/18 |
| | | | 315/151 |
| 2014/0266669 A1* | 9/2014 | Fadell | H05B 47/115 |
| | | | 340/501 |
| 2014/0354161 A1* | 12/2014 | Aggarwal | H05B 47/105 |
| | | | 315/153 |
| 2015/0008829 A1* | 1/2015 | Lurie | F21S 8/086 |
| | | | 315/153 |
| 2015/0035437 A1* | 2/2015 | Panopoulos | B60L 53/12 |
| | | | 315/112 |
| 2015/0096352 A1* | 4/2015 | Peterson | G08B 21/12 |
| | | | 73/31.02 |
| 2016/0100474 A1* | 4/2016 | Reh | H05B 47/19 |
| | | | 315/320 |
| 2016/0156765 A1 | 6/2016 | Garcia Marcho | |
| 2016/0192458 A1* | 6/2016 | Keith | H05B 47/11 |
| | | | 315/291 |
| 2016/0212831 A1* | 7/2016 | Dobai | H05B 47/19 |
| 2017/0023963 A1* | 1/2017 | Davis | H04W 48/16 |
| 2017/0108236 A1* | 4/2017 | Guan | H05B 47/105 |
| 2017/0231066 A1 | 8/2017 | Roberts et al. | |
| 2017/0264452 A1 | 9/2017 | Vollmer et al. | |

FOREIGN PATENT DOCUMENTS

| | | |
|---|---|---|
| JP | 2012230780 A | 11/2012 |
| JP | 2013120749 A | 6/2013 |
| WO | 2010/142764 | 12/2010 |
| WO | 2011123920 A1 | 10/2011 |
| WO | 2014/009888 | 1/2014 |
| WO | 2014/138380 | 9/2014 |
| WO | 2014/147524 | 9/2014 |
| WO | 2015000803 A1 | 1/2015 |

OTHER PUBLICATIONS https://www.cimconlighting.com/news/cimcon-lighting-announces-gps-support-for-its-wireless-outdoor-lighting-controllers (Mar. 11, 2014) XP055194551.

* cited by examiner

METHOD FOR SETTING UP AND OPERATING A NETWORK OF LUMINAIRES

The present invention relates to a method for setting up and operating, particularly for controlling a network of luminaires, in which case the latter are in particular street lights.

It is known from the prior art that networks of luminaires have an increasingly more intelligent controller. For example, tele-management systems for operating networks of luminaires are known, in which a so-called segment controller connected to a management console on a PC controls a number of luminaires via their control module. The segment controller which is too large to be integrated in a luminaire should be erected in such a manner that the luminaires to be controlled can communicate with it using a short-range communication module. Failure of the segment controller leads to a loss in the ability to control the network of luminaires.

It is likewise known practice to equip all control modules of the luminaires in a network to be controlled with a long-range communication module, for example based on GSM, via which the control modules communicate with a central server. Appreciable communication costs arise in this network as a result of the large number of control modules actively incorporated in a provider or long-range communication network.

Furthermore, the known systems are expensive to start up since the GPS-assisted assignment of the controllers to a luminaire must be manually carried out, in particular. Finally, the latency in the network is comparatively high on account of the large number of luminaires which can be controlled by a segment controller.

The object of the present invention is to provide a method for operating a network of luminaires which is easier to start up, ensures a higher degree of failure safety and is also more favourable during operation.

The object is achieved by means of a method according to the claims and by means of a network according to the claims. Advantageous refinements of the invention can be gathered from the subclaims which refer back thereto and from the following description.

The method according to the invention makes it possible to operate a network of luminaires in a more failsafe and cost-effective manner and simultaneously simplifies installation. A plurality of control modules are provided in a method according to the invention, wherein each of the control modules can be respectively assigned or is assigned to one luminaire, and wherein the respective control module respectively has a long-range communication module (for example GSM, GPRS, Iridium or another cellular network or an Ethernet connection), a short-range communication module (ZigBee, 6 LoWPAN or the like), preferably a near-field communication module (especially with a near field sensor), a geocoordinates module to determine the position of the control module based on GPS, GLONASS Galileo or other in particular satellite based positioning systems, a controller, preferably at least one sensor and also a control output (for example based on DALI or 0 resp. 1 to 10 volts). Control signals can be output to a driver of a luminous means of the luminaire, preferably a street light, via the control output. The network also has at least one server which can be reached via the long-range communication module and on which associated tele-management software can run. In order to set up the network, the control modules are divided into one or more groups of control modules, in which case this division is carried out on the basis of environmental, luminaire and/or control module information provided by the control modules. The long-distance communication module can be based on different techniques. For example it could be a cellular network, an IP-network or a long range peer to peer network. The division of the control modules into one or more groups of control modules is preferably performed by the server.

In this case, in addition to the geocoordinates, possible environmental information is also, in particular, information relating to adjacent control modules in the short-range network (e.g. connection quality and other RF characteristics or neighbourhood tables) and/or environment-specific information (for example ambient brightness). The luminaire information may be information relating to the luminous means used, their drivers and/or further details of the assigned luminaire, for example the current luminosity or dimming. The control module information is, in particular, information relating to the unique identification of the control module, for example its IP address or another UID (Unique IDentifier). According to the invention, one of the control modules in each group or, in the case of one group, only in that group is selected as the group controller on the server side. This group controller selection is preferably performed by the server. The further control modules in the associated group can communicate with this group controller using their short-range communication modules. That is to say, the intra-group communication is carried out using the respective short-range communication modules. The control modules in a group form a short-range network, preferably in the form of a mesh network, inside the group via the respective short-range communication modules. In the normal operating state of the network, only the group controller can transmit its own environmental, luminaire and/or control module information and the environmental, luminaire and/or control module information received from its further control modules via the short-range network to the server via the long-range communication module. In this case, normal operating mode is understood as meaning a control mode of the network, in which control modules in the network are each assigned to a group and perform their actual task, the control of the luminaire. Above and below, information is always transmitted by transmitting corresponding data on the basis of particular communication protocols.

Such a network set-up is more failsafe during operation than the previous network systems. On account of the redundant structure of the respective control modules inside a group, a new group controller can be readily determined on the server side if a group controller fails. After the new group controller has been made known inside the group, that is to say at the level of the short-range communication network (PAN=Personal Area Network), the connection is set up for those further control modules which were not defined as group controllers precisely by said group controller. This makes it possible to continue to maintain control of the system on the server side and monitoring of the system on the server side. At the same time, the costs are considerably lower on account of the one active control module (group controller) per group than if all control modules communicate separately with the server via their respective long-range module.

As a result of the intra-group network being set up as a mesh network, the failure safety and communication at the PAN level are likewise more failsafe.

If "wherein" is used above or below to explain method steps, this does not necessarily mean simultaneity of the linked method steps. Rather, these method steps can (but need not) take place at the same time.

The operation of starting up the network is also facilitated if the control module acquires geoinformation in an automated manner when the control module is started up for the first time in particular, preferably caused by voltage being applied for the first time, and therefore by an automatic sequence after the control module is switched on. The geoinformation is location data, that is to say coordinates, and an exact time stamp. The geoinformation is acquired using the geocoordinates module. At the same time or subsequently, registration with a network provider is carried out via the long-range communication module. Said network provider is preferably a provider of communication lines, for example a cellular network provider. A long distance communication network usually would be at least a cellular network. The registration can be effected, in particular, under roaming conditions, with the result that only the same registration information always has to be predefined in the factory irrespective of where the respective control modules are subsequently set up. On the control module side, the controller and/or the long-range communication module therefore has/have consistent access data.

After registration with the network provider, the geoinformation can then be transmitted to the server together with control module-specific and/or luminaire-specific information. The automated storage of the data on the server side in an associated database makes it possible to erect street lights in an uncomplicated manner. In order to reduce the communication costs, after the information relating to a control module has been transmitted, provider access data specific to a locally present long-range network can be transmitted to said control module.

In particular, the provider access data can be made available via firmware to those control modules which have an electronic SIM. In this case, the new firmware is installed on the controller or the long-range communication module, with the result that it is possible to start up the control module with low costs under local conditions. At the same time, flexible communication and installation of the associated control modules can be achieved by the provision of firmware on the server side without the control modules having to be equipped differently in the factory.

In order to simplify the management of a multiplicity of networks of street lights in particular, it is advantageous, after a control module has been started up for the first time and it has been registered on a logon server for the first time, to then assign the groups and interchange data with said groups by a server in the form of a project server.

A server need not be understood as meaning isolated, separate EDP means on the hardware side, but may also be only project-related isolation inside a tele-management program. A server may also be virtual servers on the same hardware or in a cloud.

For a trouble-free sequence after registration for the first time, the project server can preferably receive information relating to the activated devices, i.e. control modules, from the logon server.

For the purpose of reducing the costs, information relating to the active control modules to be suspended and/or deactivated in terms of their long-range communication is preferably transmitted to the long-range network provider or the network provider from the server via an interface. It is therefore ensured on the provider side that only a small number of control modules (one control module per group) is active. The other control modules can communicate with the server only via the communication path inside the mesh network, and then can communicate further with the server via the group controller. Suspension of an electronic SIM in particular results in the latter being able to be activated at short notice in case of doubt, for example if the group controller fails. The network preferably compensates for the failure of a communication path automatically and therefore only with a minimal delay and establishes a new communication path. The new communication can be initiated using a corresponding request from the server or using a time-based query and the attempt to access the provider network by the control module.

An item of information can then be transmitted to the further control modules by the server, according to which information these further control modules communicate with the new group controller in the normal operating state.

In order to set up the mesh network, it may be advantageous if data relating to the respective members of the group are transmitted to the respective group controller by the server and the respective group controller is determined as the group controller with respect to the further members of the group. Alternatively or additionally, the further members of the group may be provided with data relating to the communication path or relating to the desired group controller so that communication with the server can be effected in a trouble-free manner.

Accordingly, the information provided by the server may be information for the control modules, in the case of which said control modules are informed of adjacent control modules in the same group. Said data may be extracted on the server side from a consideration of the geocoordinates of the respective control modules, for example.

After the mesh network has been initialized and successfully set up, the group controller can transmit this message to the server. The server can then guide the group to the control mode or can start the control mode.

In order to signal successful start-up, for example successful integration of a control module in the group network or successful contact with a server, to the operating personnel when installing a new luminaire, a new control module and/or after maintenance work on the respective luminaire, the control module can operate the luminaire with different brightnesses after reaching the desired state over predefined or predefinable intervals of time.

After being installed for the first time and/or installed again, at least one of the control modules preferably receives a parameter set for operating the luminaire from the server. This may be dimming curves, for example.

The operation of a network of luminaires is also improved if the control modules in a group can be supplied with software updates via software transmitted to the group controller by the server. This makes it possible to achieve or possibly also enable new functionalities of the luminaire, for example.

Alternatively, a control module may receive new controller software, in particular firmware, directly from the server while circumventing the group controller. However, the respective control module first of all needs to be activated again at the provider for this purpose.

In order to make it possible to set up the network as quickly as possible without delay, after being switched on for the first time, the control modules can automatically scan the short-range network for further control modules and, as a result, can internally generate a neighbourhood table containing the closest neighbours in the short-range network. The list can subsequently be transmitted to a server. In particular, after the mesh network has been set up and the group controller has been allocated, this neighbourhood information can be transmitted to the server together with further luminaire-specific and control module-specific information.

For more failsafe operation, it is also advantageous if, on the basis of a frequency of disturbing events and/or a particular number of control modules which have been replaced and/or newly installed, a server instruction for the temporally limited renewed reception of neighbourhood information can be output or transmitted. For this purpose, the control modules can possibly change to another PAN-internal communication mode and can make contact with adjacent control modules via the respective short-range communication module, can record said control modules and can receive the quality of the connection to the latter. After a particular period of time has elapsed and/or after a predefined number of closest neighbours has been identified, this information can be transmitted, possibly together with further geospecific and/or luminaire-specific or control module-specific information, to the group controller via the respective short-range communication module or to the server via the long-range communication module when the connection is activated. On the basis of this information, the division of the groups and determination the group controller can be checked, changed and/or possibly carried out again on the server side.

A method in which, in order to transmit luminaire-specific information, an information carrier which is arranged on a part of the luminaire and is intended to receive luminaire-specific information is read in an automated manner and/or in a manner triggered by the control module is particularly advantageous for installing the network. The information carrier may be a chip, a memory card, an RFID tag or similar information carriers which can be contactlessly read. In particular, the information carrier is preferably contactlessly read using a near-field sensor of the control module. This is, for example, an RFID reader which communicates with an RFID transponder or an RFID tag. The information read may be used to select particular operating parameters on the control module side, but may also be used only for transmission to the server in order to receive operating parameters transmitted from the latter, for example.

The maintenance of a network of luminaires according to the invention is also improved if the luminaire-specific information is linked, on the server side, after transmission to the server, to an inventory list, the content of which can preferably be at least partially displayed if one of the parts of the luminaire fails. The individual parts of the luminaire may be provided with a web shop or another ordering option via a link, with the result that possibly non-functional parts can be newly purchased without a time delay.

Instead of querying the control modules in a group on the basis of disturbances or on the basis of a number of new control modules, the latter can preferably observe information relating to their short-range network-based environment at a predefined time and/or on account of server initialization. For this purpose, it may be useful to restrict communication inside the mesh network at short notice in the direction of the server via the group controller and to allow only observation and communication with the closest neighbours in the mesh network on the basis of the short-range module and the respective protocol. This is used to generate neighbourhood tables or lists, in which case information relating to the signal strength and/or the connection quality to the respective neighbours can be included at the same time. This information can be (temporarily) stored and can then be transmitted to the server either via the group controller or directly if all long-range communication modules of the control modules are activated.

In order to deliberately inspect or check the status of a number of control modules, they may be preferably selected on the server side before an above-described query, in which case a control module density is determined and is checked using a predefined or predefinable limit value, for example. New inclusion of the environment-specific, luminaire-specific and/or control module-specific information can then be initialized on the basis of the limit value being exceeded.

In order to make it possible for the server to make a good selection of the group controller, it may be advantageous to have the respective control modules receive and store, during a scanning operation, data relating to their UID in the short-range network, their IP address in the long-range network, their UID in the short-range radio network, luminaire-specific information, data of a number of neighbours in the short-distance network, particularly of up to 50, preferably of up to 10 adjacent control modules in the short-range network, including associated UIDs, and/or the connection quality belonging to the adjacent control modules and to then have this information (data) transmitted to the server via the group controller at a given time. If the control module is active, that is to say is provided with activated long-range network access, the server can also directly receive the information from the control module.

The commissioning of the network and the division of the groups and/or group controllers on the server are preferably carried out in an automated manner. Alternatively or additionally, the division of the groups and/or group controllers can be kept variable by means of user inputs. This is advantageous, for example, when a group controller is not uniquely selected on account of a program running on the server.

In order to keep the latency in the network below a desired level, each group is preferably assigned a maximum of a predefinable number of control modules on the server side, in which case 200 control modules potentially constitute an upper limit. Testing and simulation with up to 2000 luminaires have shown that the latency of larger network groups becomes too great in order to ensure organized operation and regular checking of the network state.

The number is preferably fewer than 200 control modules per group, in particular fewer than 50 control modules.

The failure safety of a system is also sufficiently improved if a controller is selected as the group controller in an automated manner particularly on the basis of fuzzy control strategies. Accordingly, a control module can also be suspended or deactivated in an automated manner on the basis of fuzzy control strategies.

In particular, the group controller can be selected and/or the control modules can be assigned to respective groups taking into account at least one of the rules for:
 the ratio of active to inactive control modules,
 the availability of neighbours in the short-range network,
 the number of network disturbances,
 the network changes (new vs. deleted control modules),
 the changes in the connection quality in the short-range network,
 the estimated connection costs to the long-range network provider,
 the communication of sensor data between adjacent groups,
 the intra-group latency (also a delay on the basis of the distance),
 fallback options (replacement of failed group controllers) and/or a stabilization module for taking into account time-based attenuation.

Preferably the rules are mapped and linked by an AI system. A simple combination of these rules can be based on logic operations, e.g. AND/OR/NOR combinations.

The failure strategy is also increased if a substitute group controller is at least defined on the server side using the control strategies, which substitute group controller changes from the suspended state to the active mode if the actual group controller fails.

In order to make the acquisition of environmental information relating to the short-range network and communication in the short-range network for the purpose of normal operation (communication with the server) more trouble-free, it may be advantageous if the associated communication in the short-range network is carried out in different frequency bands of the network. The same antennas can preferably be used for this purpose (multiplex operation).

According to another development of the method according to the invention, information of cross-group relevance can be interchanged between adjacent groups. In order to be able to quickly forward, in particular, sensor information or data based on sensor information with cross-group relevance, for example if the illumination situation of a travelling car or a pedestrian is involved, it is advantageous if the corresponding information is directly transmitted, while circumventing the server, to a control module in an adjacent group via the long-range network. In particular, this information may directly emanate from the control module whose sensor has produced the information. Communication can accordingly be carried out via the long-range network provider but need not run via the server. For protocol purposes, the server can be informed of the corresponding information. In particular, the information is provided here using the relaying of the group controllers known in the long-range network.

Alternatively, data based on sensor information and with cross-group relevance can be directly transmitted, while circumventing the server, to a control module in an adjacent group via the short-range network, wherein the data are preferably transmitted in a different frequency band to intra-group normal operation. In this case, multiplex operation of the short-range module may likewise be advantageous again.

On the server side, it is advantageous if a group-independent selection of control modules for interchanging data with cross-group relevance can be made in the associated software. This may be graphically supported by marking those control modules which are intended to interchange their sensor information with one another on an outline map, for example. For example, extensive intersections which, on the boundary of adjacent groups, are fitted with control modules respectively belonging to different groups may be marked in order to be able to quickly increase the light volume in the direction of travel of an approaching car.

A network according to the invention which is formed as described above or below likewise benefits from the corresponding advantages.

Further advantages and details of the invention can be gathered from the following description of the figures. In the schematically illustrated figures.

Individual technical features of the exemplary embodiments described below can also be combined, in combination with above-described exemplary embodiments and the features of the independent claims and any further claims, to form subject matters according to the invention. If useful, functionally identically acting elements are provided with identical reference numerals.

The present invention comprises a network comprising a plurality of luminaires, each luminaire having a controller or control module for controlling the operation thereof, and a server. Each controller is connected over an GSM Modem or a low power radio network (LPRN) and decides how best they can communicate to the server. In a preferred embodiment, the controllers are able to form small networks with a group controller, the group controller having an active GSM modem which is shared within the small network and through which communication is made with the server over a provider GSM network.

As each controller communicates with the group controller, there is no need for more than one active GSM modem to be present in each small network with the advantage that costs can be reduced (GSM network costs). Each controller uses the LPRN to communication to its group controller using 6LoWAN using an IPv6 protocol. As a result, each small network comprises an internet protocol version 6 (IPv6) network and communication within the network is only using IPv6 protocols.

The server also operates using IPv6 protocols. However, to transmit information from each group controller to the server, a GSM network is needed and currently, these operate using internet protocol version 4 (IPv4) protocols. This means that communication between the group controller and the server needs to be converted from IPv6 to IPv4 for transmission over the GSM network and then converted back again at the server. In addition, the communication over the GSM network is encrypted and secure, the encryption being provided in accordance with a suitable encryption protocol.

The server can decipher the encrypted communications received from group controllers over the GSM network and can also encrypt communications for transmission to the group controllers over the GSM network. This provides an end-to-end encrypted communication between the group controllers and the server.

Figure 1:
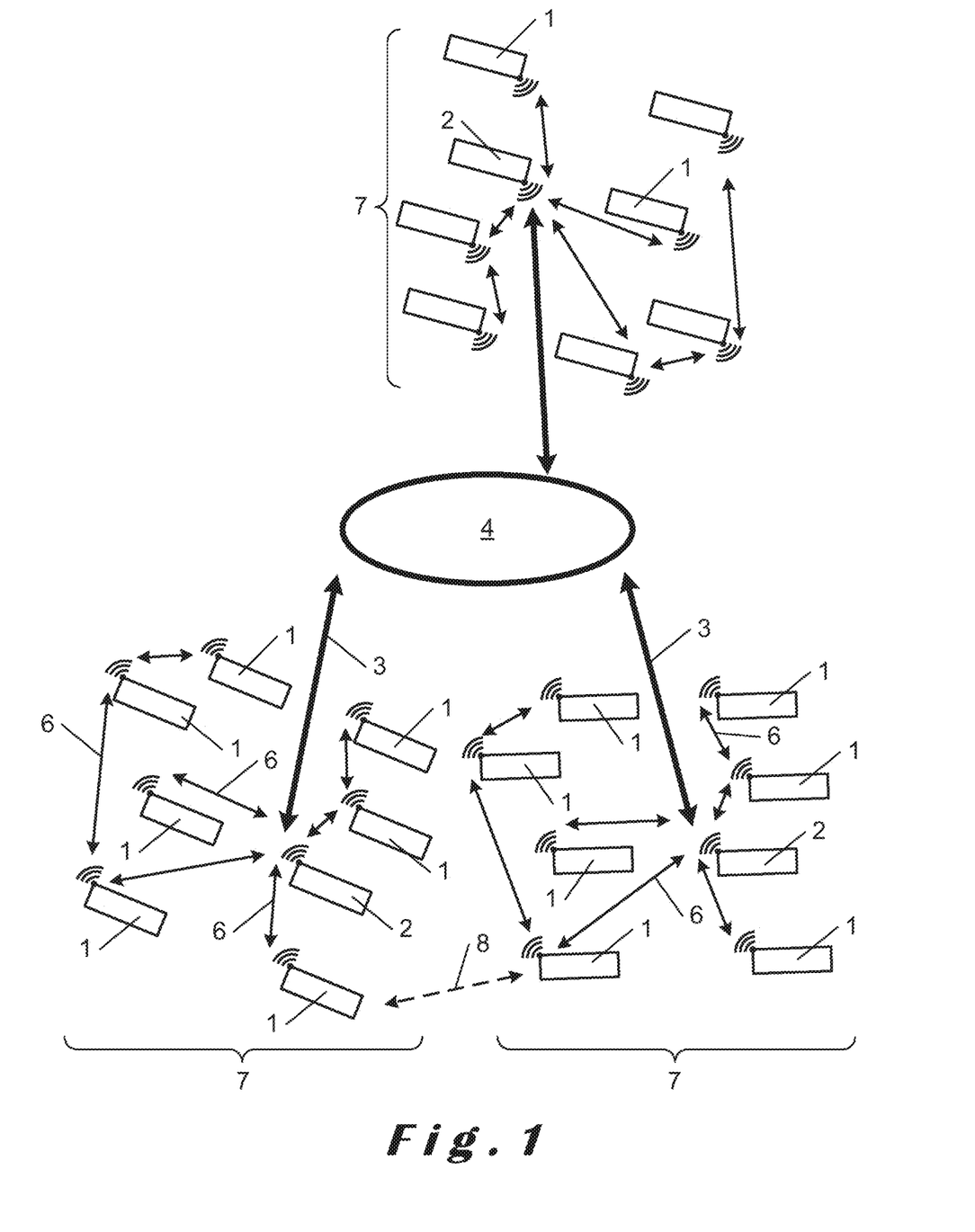
FIG. 1 shows a network according to the invention.

According to the method according to the invention, a multiplicity of control modules 1 are each assigned to a group controller 2 according to FIG. 1. In terms of hardware, the group controller 2 has an identical structure to the control modules 1. However, only the respective group controller 2 is able to interact with a server 4 via a long-range connection 3. This is typically access to a local cellular network provider, via which the server is then kept reachable based on IP-WAN. Communication between the server and the group controllers can be carried out using a common Internet protocol (TCP/IP), for example. As described above, this communication is using IPv6 protocol, and communication between the server and the group controllers involves tunnelling between IPv6 and IPv4 for transmission onto the GSM network, a communication using IPv4 over the GSM network, and a tunnelling between IPv4 and IPv6 at the server.

It will readily be understood that the requirement for the conversion/tunnelling between IPv6 and IPv4 and back again is due to the GSM network operating at IPv4. However, in the future, once the GSM network operates at IPv6, there will be no need for this conversion/tunnelling.

It will also be appreciated that in other embodiments of the present invention, the group controller and the server may operate on the same version of IP protocol as the GSM network.

Inside a group 7, the control modules communicate with one another via short-range connections 6. This is preferably communication based on a mesh network on the IEEE 802.15.4 standard, for example ZigBee.

The respective groups 7 of control modules 1, 2 generally cannot see one another across the groups and therefore cannot hinder one another. However, for the purposes of cross-group communication, provision may be made for spatially adjacent control modules to be able to share or interchange data from sensors with one another in a cross-group manner or to forward said data or corresponding information via a short-range connection 8. Actions, for example increasing the luminosity, may then be derived therefrom. Alternatively, this communication can also be carried out using the associated group controllers 2 which can see one another via their IP address on the Internet. The information relating to which control module can communicate with which control module and how this module can communicate is stipulated on the server side and is achieved in a cross-group manner, for example for the case of short-range communication, by means of a multiplexing unit of each control module, in particular.

Figure 2:
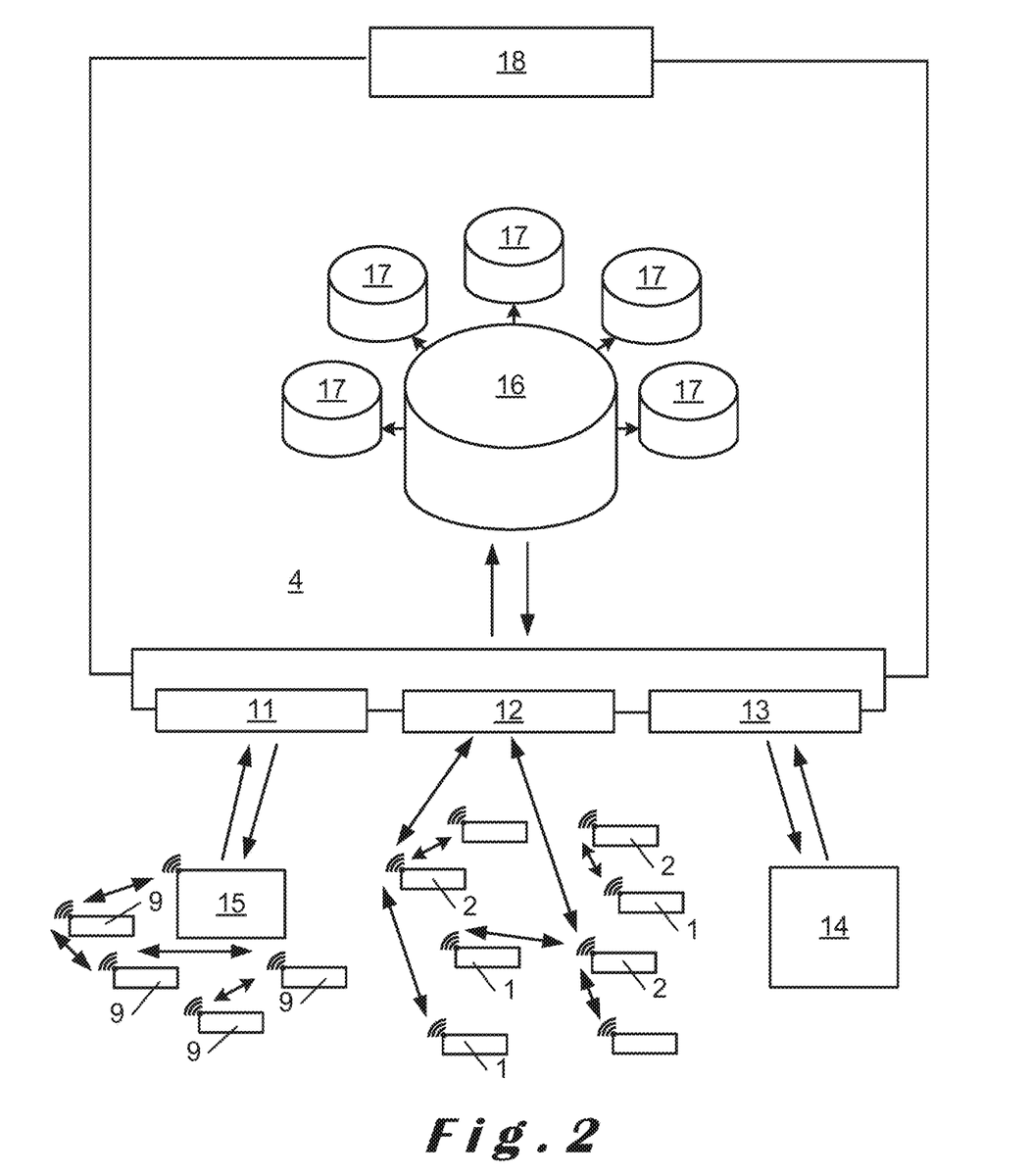
FIG. 2 shows a further subject matter according to the invention.

A server for operating a network according to the invention can also, in addition to connecting one or more groups 7 of control modules 1, 2 which set up a PAN, control a network according to the known prior art with a segment controller 15 (FIG. 2). The latter in turn manages a number of luminaire controllers 9. The segment controller 15 is connected via an interface 11 which can be used to interchange data with the server 4. In addition to connecting the plurality of groups 7 via possibly a further interface 12, the server 4 may operate data interchange with a long-range network operator 14 again via a further interface (API) 13.

A database 16 which interacts with different operating modules (clients) 17 generally runs on the server itself. A user can access the server and its programs for operating and controlling the luminaire groups via a graphical user interface 18.

Figure 3:
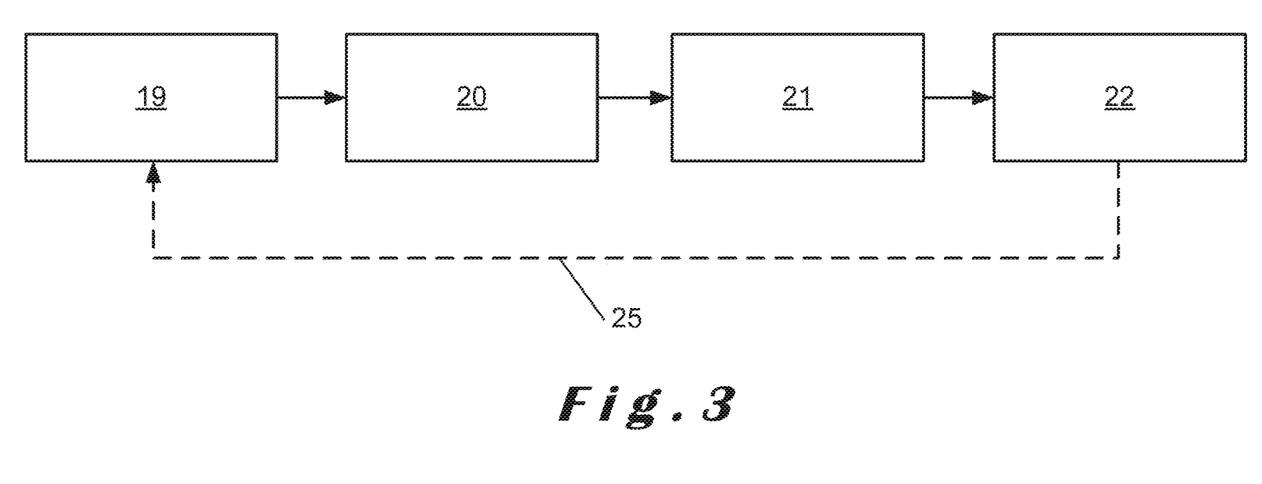
FIG. 3 shows a simplified flowchart for a method according to the invention.

FIG. 3 gives a shortened description of the sequence of setting up a network of street lights. After a number of control modules have been installed in a first phase 19 on street lights, the control modules will scan their environment in a second phase 20 which is either started on the server side or starts independently and will transmit the respective environmental information and any further luminaire-specific and control module-specific information to the server. This can be carried out either directly under roaming conditions with a first provider or possibly with a further local network provider predefined by the server after the respective control modules have been registered for the first time. After the environmental information and further information has been transmitted by the respective control modules of the street lights, the control modules are determined and allocated (phase 21) in groups and the group controller is determined and allocated. At the PAN level, the network can be set up on the basis of the standard used, for example dynamically. After the respective group controllers have transmitted a data signal to the server relating to the successful realization of internal group communication, the system will change to a control mode 22.

Assuming that a further number of new control modules, which can be predefined on the server side, have been installed, the process can be carried out again according to the feedback loop 25.

Figure 4:
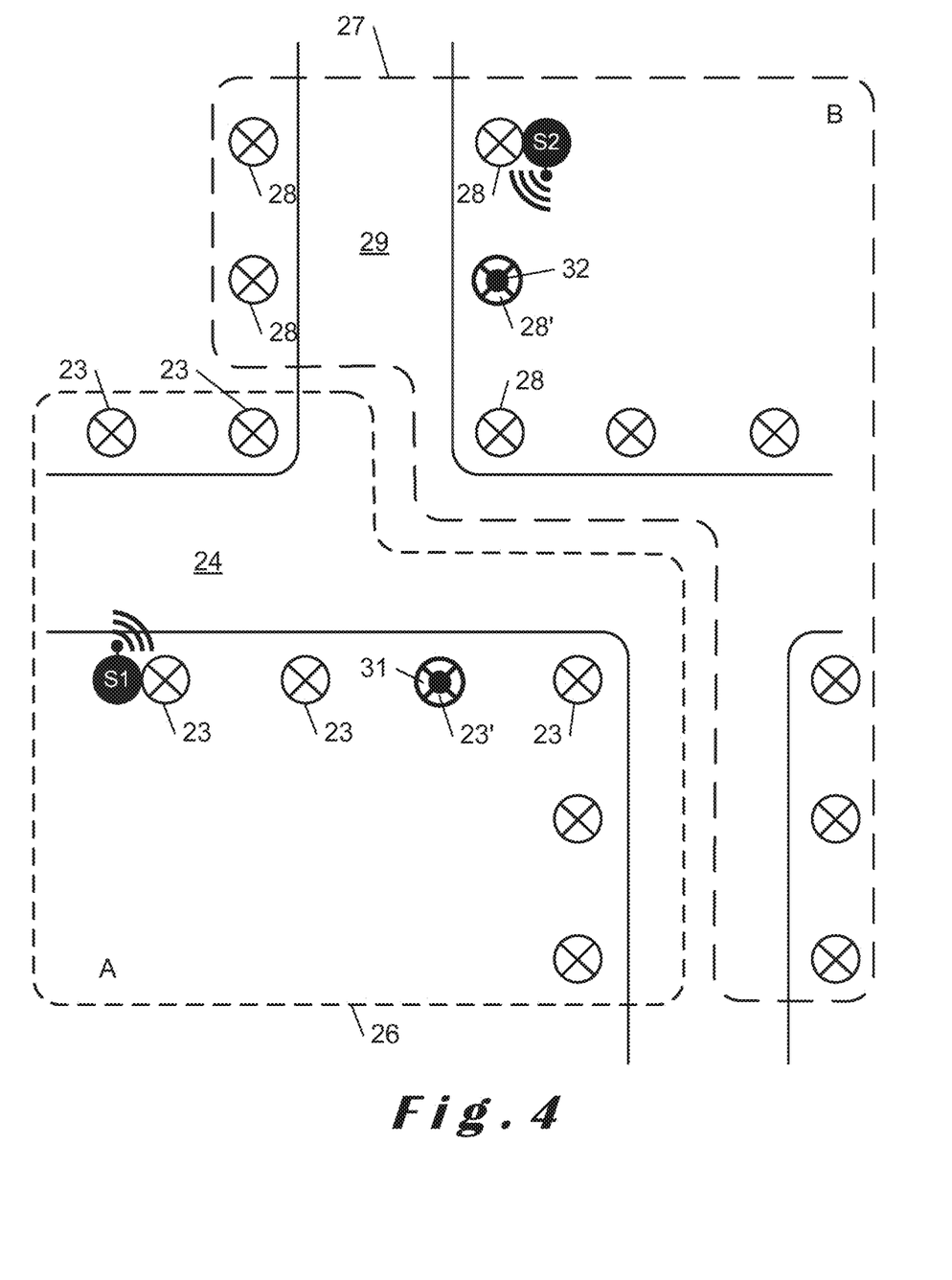
FIG. 4 shows a further subject matter according to the invention.

According to another exemplary embodiment of the invention according to FIG. 4, a plurality of luminaires with respective control modules 23 and 23' are arranged along a road 24. The luminaires belong to a group of luminaires or control modules A which was predefined on the server side. Like a group B, the group A is marked by dashed lines 26 and 27, respectively. Luminaires with associated control modules 28 and 28' which line a cross street 29 opening into the road 24 belong to group B. Inner black circles 31 and 32 indicate a luminaire with an active control module, a group controller. Sensors S1 and S2 are assigned to respective control modules 23 and 28. In particular, radar sensors, infrared sensors (in particular passive infrared sensors) or else induction loops in the road 24 and 29 are possible here as sensors. Said sensors detect an approaching object, whereupon the control modules adapt the light from the respective street lights in the group to the situation both within the groups and across the groups.

For example, if an approaching car is detected using the control module 23 of a street light, which is provided with the sensor S1, the information is shared in group A, the light in group A is turned up using control modules 23 and 23' and this information or the information relating to the approaching car is transmitted to the group controller 28' in group B via the group controller 23'. The brightness is then also adapted in the relevant luminaires of control modules 28 and 28', that is to say the luminaires selected on the server side, in group B. Alternatively, the control module 23 provided with the sensor S1 could also communicate directly with the group controller 28' in group B or with a further control module 28 which is assigned to said controller 28' and belongs to one of the street lights, whereupon the information is shared in the network and a corresponding reaction is given in group B.

The respective control modules and therefore the associated street light lights can be assigned on the server side to a first group which is intended to be supplied with an item of sensor information from a sensor in an adjacent group and which is then used to forward information in a cross-group manner. Corresponding input masks are available for this purpose on the server side, in particular.

Figure 7:
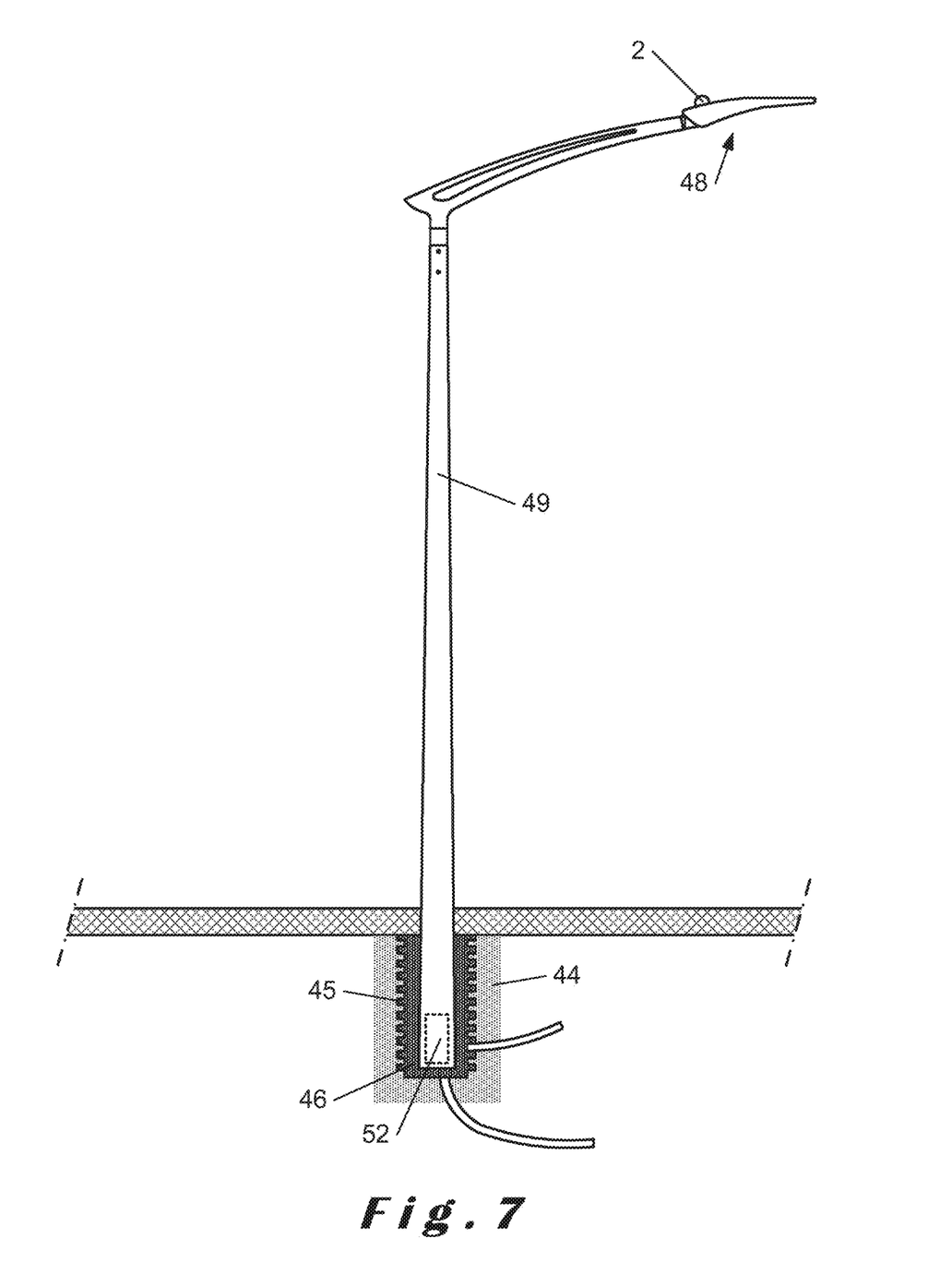
FIG. 7 shows a part of a subject matter according to the invention according to FIG. 6.

A control module according to the invention which can be used to implement the method described above can preferably be placed onto a luminaire head, for example of a street light, as a separate unit (cf. FIG. 7). The important parts of a control module which can be externally attached are disclosed in more detail in FIG. 5. In the exploded illustration illustrated there, the control module comprises an upper housing part 33 and a lower housing part 34. The lower housing part can be fastened to a base to be arranged on the top side of the light via a seal 36. The connection to the base is effected using contacts 37 to be twisted in a bayonet-like manner. The contacts 37 are fastened in the housing 34, on the one hand, and bear a central printed circuit board unit 38, on the other hand. A controller 39, short-range and long-range communication modules and an acceleration sensor unit 41 for detecting seismic waves, in particular, are present, inter alia, on said printed circuit board unit.

Figure 5:
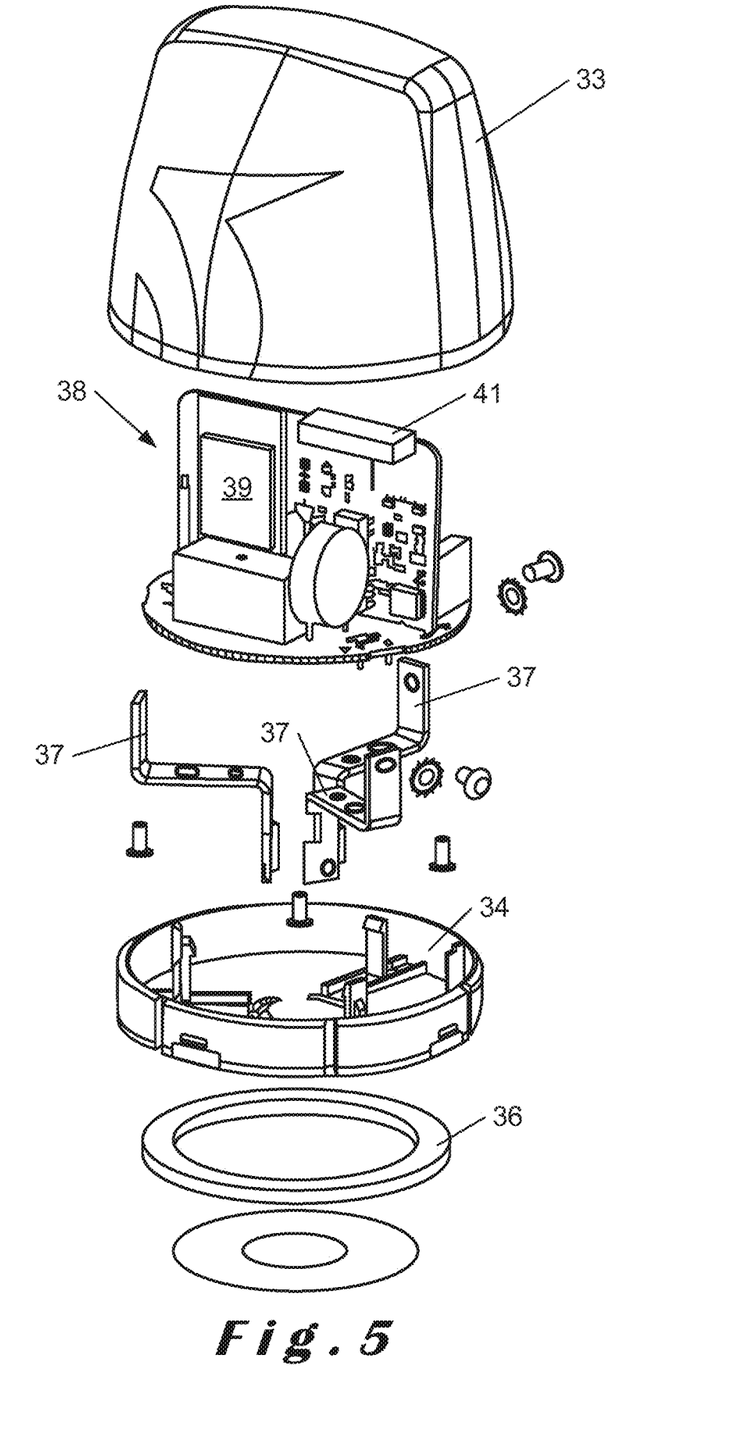
FIG. 5 shows a part of a subject matter according to the invention.

An RFID reader which can be introduced into a base on the luminaire housing side in order to be able to receive luminaire-specific data from an RFID transponder in the near field is not illustrated.

Figure 6:
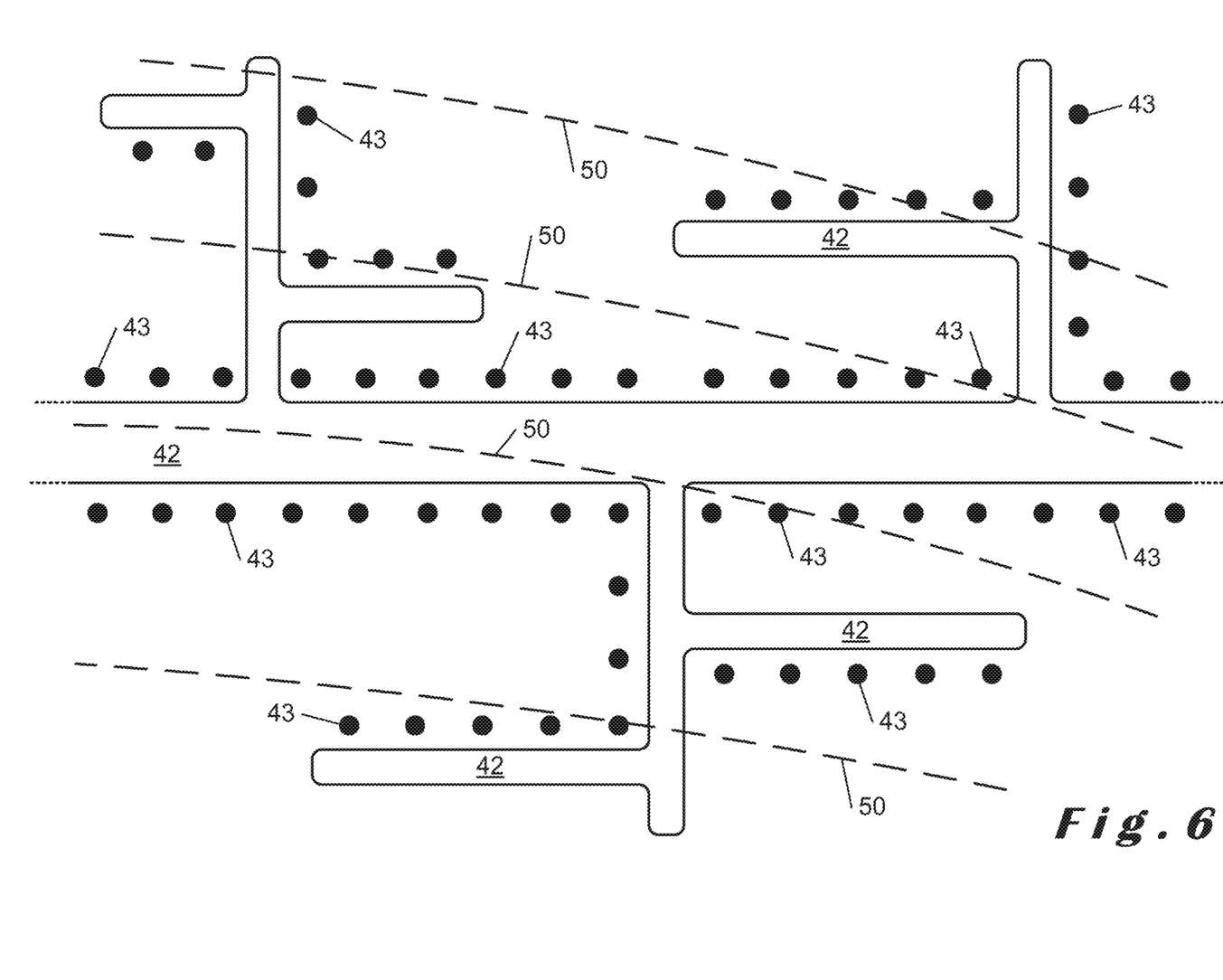
FIG. 6 shows a further subject matter according to the invention.

The depiction according to FIG. 6 illustrates a road system having a plurality of roads 42 of a length of several hundred metres. These roads are lined by a multiplicity of street light lights 43 with respective control modules. The control modules are each provided with sensors for detecting seismic waves. These may be simple acceleration sensors, on the one hand. Alternatively, more complicated seismometers may also be used in a manner integrated in the street light. The data emanating from the acceleration sensors, which are preferably integrated in the control module directly inside the housing, can be transmitted to the server via the group controller and its long-range communication module. As a result, it is possible to detect seismic waves even in the case of relatively inaccurate sensors on account of the multiplicity of signals transmitted by said sensors and to analyse them in a spatially and temporally resolved manner in the server on the basis of the geocoordinates to be concomitantly transmitted by the control modules and the group controller. This results in a comparatively accurate depiction of the earthquake progress even with a poor resolution of the P waves and/or S waves. Accordingly, information relating to the epicentre of the earthquake can also be extracted from the information. This can happen either on the server of the network or on a special server assigned to an earthquake centre. Accordingly, a subsequent tsunami warning or else an earthquake warning may also result via control of the luminaires, for example by emitting light signals previously disclosed to the population. These may be, for example, wave-like light signals of alternating and propagating luminosities which run along the road.

By integrating a street light according to FIG. 7 in the ground and permanently arranging and connecting said street light to the ground using a layer of lean concrete 44, a foundation pipe 45 and dense filling material 46, for example, acceleration sensors arranged in the control module in or on the luminaire head 48 can effectively pick up the seismic waves propagating in the soil or along its surface via the mast 49. Alternatively or additionally, a more finely resolving seismometer S2 may also be arranged in the base of the mast 49, which seismometer is connected to the control module 2 via a data line (not shown). A great advantage of the system is the evaluation of a multiplicity of sensors which are distributed over a large area, which evaluation can be carried out virtually at the same time and enables an analysis in order to detect seismic waves 50 illustrated using dashed lines in FIG. 6. At the same time, an information system which can be used to simultaneously inform a multiplicity of road users is possible.

EMBODIMENTS

1. A method for operating a network of luminaires, the method including the steps of:
   providing a network of luminaires comprising a plurality of luminaires, each luminaire having a control module associated therewith, each of the control modules comprising:
      a long-range communication module,
      a short-range communication module,
      a geocoordinates module, and
      a controller,
   each control module being operable for providing a control output for controlling a driver of the luminaire, the control output comprising control signals for the driver of a luminous means of the associated luminaire,
   providing at least one server reachable via the long-range communication module,
   setting up the network by dividing the control modules into at least one group of control modules on the basis of at least one of: environmental, luminaire and control module information provided by the control modules,
   selecting one of the control modules in each group as the group controller,
   forming a short-range network of further control modules, within each group via the respective short-range communication modules, the further control modules in each group communicating with one another and with their group controller by means of their short-range communication modules, and
   transmitting, in a normal operating state of the network, from the group controller to the server, at least one of its own: environmental, luminaire and control module information, and at least one of the environmental, luminaire and control module information received from the further control modules via the short-range communication module.

2. Method according to embodiment 1, wherein the step of dividing the control modules (1, 2, 23, 23', 28, 28') into at least one group (A, B) is further performed on the basis of environmental information provided by the control modules.

3. Method according to embodiment 2, wherein environmental information is transmitted, in the normal operating state of the network, from the group controller (2, 23', 28') to the server.

4. Method according to any of the preceding embodiments, wherein each control module (1, 2, 23, 23', 28, 28') further comprises a near-field communication module.

5. Method according to any of the preceding embodiments, wherein the control modules further comprise at least one sensor (41).

6. Method according to any of the preceding embodiments, wherein the short-range network is in the form of a mesh network.

7. Method according to one of the preceding embodiments, further comprising the steps of:
   acquiring geoinformation when a control module (1, 2, 23, 23', 28, 28') is started up for the first time,
   registering with a network provider (14) via the long-range communication module, and
   transmitting the geoinformation to the server (4) with at least one of: control module-specific and luminaire-specific information.

8. Method according to embodiment 7, further comprising applying a voltage for the first time to the start up the control module for the first time.

9. Method according to embodiment 7 or 8, wherein the registering with a network provider (14) is performed under roaming conditions.

10. Method according any one of embodiments 7 to 9, further comprising, after transmitting information relating to a control module (1, 2, 23, 23', 28, 28'), the step of: transmitting to said control module (1, 2, 23, 23', 28, 28') provider access data specific to a locally present long-range network.

11. Method according to any one of the preceding embodiments, further comprising, after a control module (1, 2, 23, 23', 28, 28') has been started up for the first time and it has been registered on a logon server, performing the steps of using a project server:

assigning the at least one group, and interchanging data with said at least one group.

12. Method according to embodiment 11, further comprising the step of: receiving, at the project server from the logon server, information relating to activated control modules.

13. Method according to any one of the embodiments 7 to 9, further comprising the step of: transmitting, to the network provider (14) and via an interface, information relating to the further control modules to be suspended or deactivated in terms of their long-range communication.

14. Method according to any one of the preceding embodiments, further comprising the step of: transmitting an item of information from the server (4) to the further control modules (1, 2, 23, 23', 28, 28') indicating which of these control modules (1, 2, 23, 23', 28, 28') are not required to carry out any long-range communication in the normal operating state.

15. Method according to any one of the embodiments 7 to 10 and 13, wherein the provider access data are made available via firmware to those control modules (1, 2, 23, 23', 28, 28') which have an electronic SIM.

16. Method according to any one of the embodiments 7 to 10, 13 and 15, further comprising the step of: activating, suspending or deactivating individual control modules (1, 2, 23, 23', 28, 28') on the server side via an API (13) to a long-range network provider (14).

17. Method according to any one of the preceding embodiments, further comprising the steps of:

transmitting, using the server (4), data relating to the respective members of the group to the respective group controller (2, 23', 28'), and determining the respective group controller as the group controller with respect to the further members of the group.

18. Method according to any one of the preceding embodiments, further comprising the step of: providing, using the server (4), the control modules (1, 2, 23, 23', 28, 28') in a group (A, B) with information relating to adjacent control modules in the same group.

19. Method according to any one of the preceding embodiments, further comprising, after successfully setting up a network inside the group, the step of reporting this successful set up to the server (4), using the group controller (2, 23', 28').

20. Method according to any one of the preceding embodiments, further comprising, after having voltage applied to the control module (1, 2, 23, 23', 28, 28'), the step of operating, using the control module (1, 2, 23, 23', 28, 28'), the luminaire with different brightnesses over predefined or predefinable intervals of time.

21. Method according to any one of the preceding embodiments, further comprising the step of: after at least one of the control modules (1, 2, 23, 23', 28, 28') has been installed for the first time or installed again, receiving, in at least one of the control modules (1, 2, 23, 23', 28, 28') from the server (4), a parameter set for operating the luminaire.

22. Method according to any one of the preceding embodiments, further comprising the steps of:

transmitting, from the server (4) to the group controller (2, 23', 28'), software, and supplying the control modules (1, 2, 23, 23', 28, 28') in a group with software updates via the software transmitted to the group controller (2, 23', 28') by the server (4).

23. Method according to any one of the preceding embodiments, further comprising the step of receiving, in that at least one control module (1, 2, 23, 23', 28, 28') from the server (4), new controller firmware.

24. Method according to any one of the preceding embodiments, further comprising the step of: using the control modules (1, 2, 23, 23', 28, 28'), scanning automatically the short-range network for additional control modules which have been switched on for the first time.

25. Method according to any one of the preceding embodiments, further comprising, on the basis of a frequency of disturbing events, the steps of:

transmitting a server request for the temporally limited renewed reception of neighbourhood information, receiving, at the control modules (1, 2, 23, 23', 28, 28') in a group (A, B), information on adjacent control modules (1, 2, 23, 23', 28, 28') and the quality of the connection to the latter via the short-range communication module, transmitting this information to the group controller (2, 23', 28') via one of: the short-range communication module and the server (4) via the long-range communication module, and using the server (4), performing at least one of: making and checking for possible changes to the division of the groups (A, B).

26. Method according to any one of the preceding embodiments, further comprising the steps of:

providing an information carrier arranged on a part of the luminaire, receiving luminaire-specific information at the information carrier, and reading the information carrier in at least one of an automated manner and triggered manner.

27. Method according to embodiment 26, further comprising reading the information carrier using a near-field sensor of the control module.

28. Method according to embodiment 26 or 27, further comprising linking, on the server side, the luminaire-specific information to an inventory list, the content of which can at least partially be displayed if one of the parts of the luminaire fails.

29. Method according to any one of the preceding embodiments, further comprising the steps of:

observing, using the control modules (1, 2, 23, 23', 28, 28') in a group, information relating to their short-range network-based environment at a predefined time and/or on account of server initialization, receiving, using said control modules (1, 2, 23, 23', 28, 28'), at least temporarily store information relating to respective adjacent control modules in said environment, and transmitting, using said control modules (1, 2, 23, 23', 28, 28'), said information to the server (4) either via the group controller (2, 23', 28') or directly.

30. Method according to any one of the preceding embodiments, further comprising the steps of:

selecting a plurality of control modules (1, 2, 23, 23', 28, 28'), determining a control module density, checking said control module density using a predefined or predefinable limit value, and querying said control modules (1, 2, 23, 23', 28, 28').

31. Method according to any one of the preceding embodiments, further including the following step, performed by the respective control modules (1, 2, 23, 23', 28, 28'): transmitting to the server (4) data relating to at least one of: their UID in the short-range network, their IP address in the long-range network, their UID in the short-range radio network, luminaire-specific information, data relating to up to 50 adjacent control modules (1, 2, 23, 23', 28, 28') in the short-range network, up to 10 adjacent control modules (1, 2, 23, 23', 28, 28') in the short-range network, including any UIDs, and the connection quality belonging to the adjacent control modules.

32. Method according to any one of the preceding embodiments, wherein the groups and/or group controllers are divided on the server in an automated manner.

33. Method according to any one of embodiments 1 to 32, wherein the division of the groups and/or group controllers is kept variable by means of user inputs.

34. Method according to any one of the preceding embodiments, wherein each group is assigned the same number as or fewer than a predefinable number of control modules.

35. Method according to embodiment 34 wherein the number is 200.

36. Method according to any one of the preceding embodiments, wherein a control module (1, 2, 23, 23', 28, 28') is selected as the group controller (2, 23', 28') in an automated manner on the basis of fuzzy control strategies.

37. Method according to any one of the preceding embodiments, wherein a control module (1, 2, 23, 23', 28, 28') is suspended or deactivated in an automated manner on the basis of fuzzy control strategies.

38. Method according to embodiment 36 or 37, wherein the selection is made taking into account rules for at least one of:
    a) the ratio of active to inactive control modules,
    b) the availability of neighbours in the short-range network,
    c) the number of network disturbances,
    d) the network changes (new vs. deleted control modules),
    e) the change in the connection quality in the short-range network,
    f) the estimated connection costs to the long-range network provider,
    g) the communication of sensor data between adjacent groups,
    h) the latency, possibly on the basis of the distance,
    i) the failure and replacement of active group controllers, and
    j) a stabilization module for taking into account time-based attenuation.

39. Method according to embodiment 37 wherein the rules are mapped and linked using an AI system.

40. Method according to any one of the preceding embodiments, further comprising the steps of:
    defining at least one substitute group on the server side using the control strategies,
    changing the substitute group controller from the suspended state to the active mode if the current group controller fails.

41. Method according to any one of the preceding embodiments, further comprising the step of acquiring environmental information relating to the short-range network and communication in the short-range network for the purpose of normal operation in different frequency bands of the short-range network.

42. Method according to embodiment 41, wherein the same antenna is used for the different frequencies.

43. Method according to any one of the preceding embodiments, further comprising the step of transmitting data based on sensor information and with cross-group relevance directly, by circumventing the server, to a control module in an adjacent group via the long-range network.

44. Method according to any one of the preceding embodiments, characterized in that data based on sensor information and with cross-group relevance is directly transmitted, while circumventing the server, to a control module in an adjacent group via the short-range network, wherein the data are transmitted in a different frequency band to intra-group normal operation.

45. Method according to embodiment 43 or 44, further comprising performing, on the server, a group-independent selection of control modules (1, 2, 23, 23', 28, 28') for interchanging data with cross-group relevance.

46. Network of luminaires comprising a plurality of luminaires, each luminaire being a street light and having a control module (1, 2, 23, 23', 28, 28') associated therewith, each of the control modules (1, 2, 23, 23', 28, 28') comprising:
    a long-range communication module,
    a short-range communication module,
    a geocoordinates module, and
    a controller (39),
each control module being operable for providing a control output for controlling a driver of the luminaire, the control output comprising control signals for the driver of a luminous means of the associated luminaire, and
    at least one server (4) reachable via the long-range communication module,
    the network operating in accordance with any one of the preceding embodiments.

47. The method according to embodiment 1, wherein environmental information is any one of: geocoordinates, information relating to adjacent control modules in the short-range network and environment-specific information.

The invention claimed is:
1. Method for operating a network of luminaires, the method including the steps of:
    providing a network of luminaires comprising a plurality of luminaires with a plurality of control modules, wherein the plurality of control modules comprises a first control module comprising a long-range communication module and a short-range communication module, and a second control module comprising a long-range communication module and a short-range communication module;
    providing at least one server reachable via the long-range communication modules of the first and second control module;
    setting up the network by dividing the plurality of control modules into at least one group of control modules;
    selecting the first control module of the plurality of control modules as the group controller of a group of the at least one group;
    forming a short-range network of further control modules within each group, the further control modules in each group communicating with one another and with their group controller by means of short-range communication modules;
    transmitting, in a normal operating state of the network, from the group controller to the server, at least one of: environmental, luminaire and control module information, and at least one of environmental, luminaire and control module information received from the further control modules via the short-range communication module; and
    upon failure of the first control module, selecting by the server of the second control module as group controller.

2. The method of claim 1, wherein the first control module and the second control module each comprise a geo-coordinates module.

3. The method of claim 1, wherein the first control module and the second control module each comprise a controller for controlling a driver of the associated luminaire.

4. The method of claim 1, wherein the step of setting up the network by dividing the control modules into at least one group of control modules is performed on the basis of at least one of: environmental, luminaire and control module information provided by the plurality of control modules.

5. The method of claim 1, wherein the first and second control module each comprises at least one of a near-field communication module and a sensor.

6. The method of claim 1, wherein the short-range network is in the form of a mesh network.

7. The method of claim 2, further comprising the steps of: acquiring geo-information when the first control module is started up for the first time, registering with a network provider via the long-range communication module, and transmitting the geo-information to the server with at least one of: control module-specific and luminaire-specific information.

8. The method of claim 7, further comprising applying a voltage for the first time to the start up the first control module for the first time.

9. The method of claim 7, wherein the registering with a network provider is performed under roaming conditions.

10. The method of claim 7, further comprising, after transmitting information relating to a control module, the step of: transmitting to said control module provider access data specific to a locally present long-range network.

11. The method of claim 1, further comprising, after the first control module has been started up for the first time and it has been registered on a logon server, performing the steps of using a project server: assigning the at least one group, and interchanging data with said at least one group.

12. The method of claim 1, further comprising, after successfully setting up a network inside the group, the step of reporting this successful set up to the server, using the group controller.

13. The method of claim 1, further comprising, after having voltage applied to the first control module, the step of operating, using the first control module, the luminaire with different brightnesses over predefined or predefinable intervals of time.

14. The method of claim 1, further comprising the step of: after at least one of the control modules has been installed for the first time or installed again, receiving, in at least one of the control modules from the server, a parameter set for operating the luminaire.

15. The method of claim 1, further comprising the steps of:
transmitting, from the server to the group controller, software, and
supplying the further control modules in a group with software updates via the software transmitted to the group controller by the server.

16. The method of claim 1, further comprising the step of: using the plurality of control modules, scanning automatically the short-range network for additional control modules which have been switched on for the first time.

17. A method for operating a network of luminaires, the method including the steps of:
providing a network of luminaires comprising a plurality of luminaires with a plurality of control modules, said plurality of control modules comprising a group controller comprising a long-range and a short-range communication module, wherein the plurality of luminaires comprises a luminaire with a control module comprising a near-field communication sensor;
providing at least one server reachable via the long-range communication module of the group controller,
providing an information carrier arranged on a part of said luminaire,
receiving luminaire-specific information at the information carrier,
reading the information carrier in at least one of an automated manner and triggered manner, using said near-field sensor of said control module;
linking, on the server side, the luminaire-specific information to an inventory list, the content of which can at least partially be displayed if one of the parts of the luminaire fails.

18. The method of claim 17, wherein the plurality of luminaires comprises further control modules each comprising a short-range communication module, the method further comprising the step of transmitting, in a normal operating state of the network, from the group controller to the server, at least one of: environmental, luminaire and control module information, and at least one of environmental, luminaire and control module information received from the further control modules via the short-range communication module.

19. A method for operating a network of luminaires, the method including the steps of:
providing a network of luminaires comprising a plurality of luminaires comprising a plurality of control modules, a control module thereof comprising a long-range communication module, a short-range communication module, a geo-coordinates module, and a controller, the control module being operable for providing a control output for controlling a driver of the associated luminaire,
providing at least one server reachable via the long-range communication module,
setting up the network by dividing the control modules into at least one group of control modules,
selecting one of the control modules in each group as the group controller,
forming a short-range network of further control modules within each group via the respective short-range communication modules, the further control modules in each group communicating with one another and with their group controller by means of their short-range communication modules, and
wherein the selection is made taking into account rules for at least one of: an availability of neighbors in the short-range network, a number of network disturbances, network changes, a change in the connection quality in the short-range network, an estimated connection cost to the long-range network provider, a communication of sensor data between adjacent groups, a latency, a failure and replacement of active group controllers, and a stabilization module for taking into account time-based attenuation.

20. The method of claim 19, wherein the rules are mapped and linked using an AI system.

21. The method of claim 1, further comprising the step of transmitting data based on sensor information and with cross-group relevance directly, by circumventing the server, to a control module in an adjacent group via the long-range network or via the short-range network, wherein optionally the data are transmitted in a different frequency band to intra-group normal operation.

\* \* \* \* \*